Figure 1:
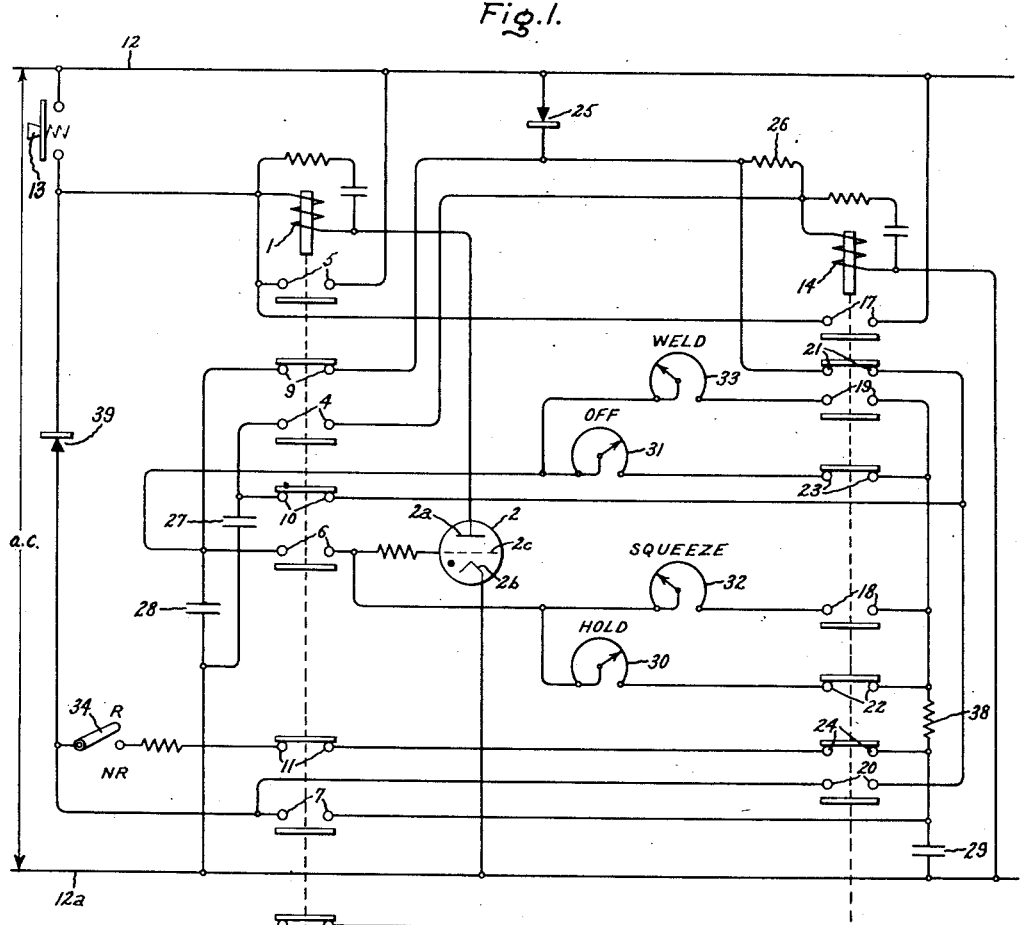

May 21, 1957 M. E. BIVENS 2,793,329
SEQUENCE AND TIMING CONTROL SYSTEM
Filed April 14, 1954 2 Sheets-Sheet 1

Inventor:
Maurice E. Bivens,
by Irving H. Marshman
His Attorney.

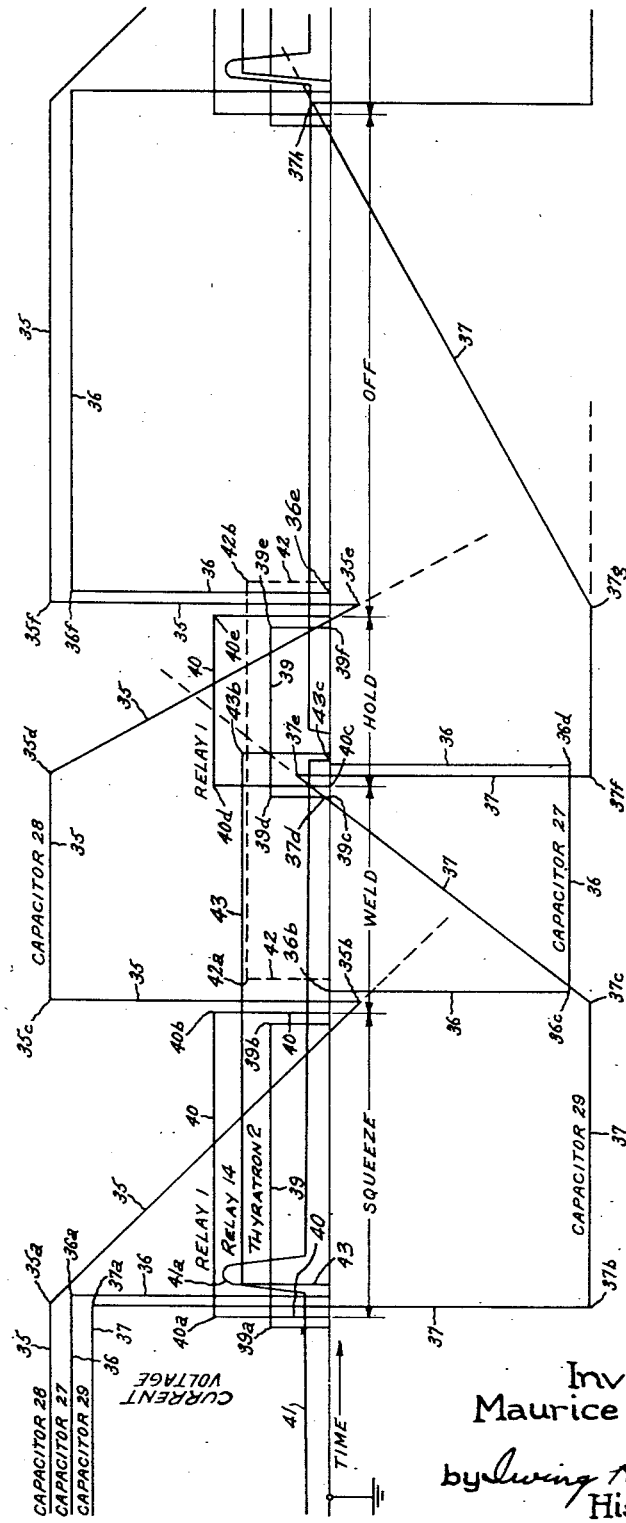

United States Patent Office 2,793,329
Patented May 21, 1957

2,793,329

SEQUENCE AND TIMING CONTROL SYSTEM

Maurice E. Bivens, Schenectady, N. Y., assignor to General Electric Company, a corporation of New York Application April 14, 1954, Serial No. 423,191

13 Claims. (Cl. 317—142)

This invention relates to control systems, more particularly to electric valve control systems, and it has for an object the provision of a simple, reliable, improved and inexpensive control system of this character.

More specifically, the invention relates to systems for controlling the sequence and timing of industrial operations. For example, in resistance welding, the different steps of the welding process must follow each other in predetermined sequence, and the period of each such step must be accurately timed. In general, the resistance welding process includes four such periods. They are:

1. "Squeeze" time. This period provides the time required for advancing the welding electrodes toward each other to clamp and securely hold two or more pieces of metal at the point at which the weld is to be made.

2. "Weld" time. This period determines the time during which a heavy current of electricity is passed through the electrodes and the metal to be welded. The resistance of the metal to the current develops heat, which softens the adjoining metal faces.

3. "Hold" time. This period determines the time during which electrode pressure is maintained to hold the pieces of metal after termination of the welding current until a homogeneous weld is formed.

4. "Off" time. This period determines the time following completion of the weld and separation of the electrodes before the electrodes can again be moved to work engaging position. During this period, the workpiece is either moved or removed to prepare for the next welding operation.

In the past, such a sequence of control operations has been achieved by means of a plurality of control relays equal to the number of operations or steps to be timed, together with a separate resistance-capacitance timing circuit for each relay. An object of this invention is the provision of a control system of this character in which such sequence and timing of four successive operations is achieved by means of two electromagnetic control relays, and two timing capacitors. Another object of the invention is the provision of a control system of the character described, in which a plurality of at least four operations are timed by means of a single electric valve having a control electrode to which a pair of capacitors are selectively connected to time both the conducting period and the nonconducting period of the valve.

A more specific object of the invention is the provision of a control system of the character described, in which one of two control relays is caused to operate a plural number of times for each single operation of the other in response to successive timed conducting and nonconducting periods of the electric valve.

In carrying the invention into effect in one form thereof, there are provided two electromagnetic switching devices, together with a control initiating device for controlling the energization of the switching devices. Associated with the switching devices is a timing unit which contains two timing capacitors and a plurality of adjustable resistors which, together with the capacitors, constitute a plurality of timing circuits which are selectively and sequentially energized in response to operation of the electromagnetic switching devices, for effecting a predetermined number of operations of one of them. Interlocking control circuits jointly controlled by both electromagnetic switching devices effect a number of operations of the other such that, for each single operation of one of the devices, the other operates a plural number of times.

Figure 3:
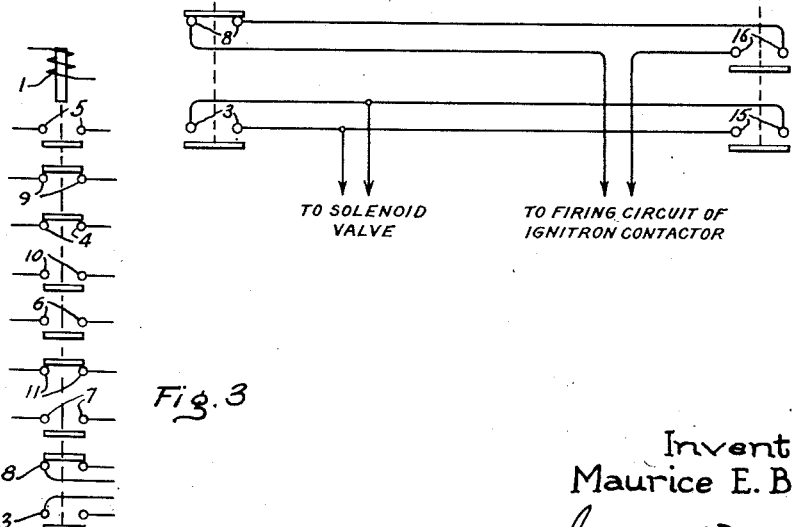

For a better and more complete understanding of the invention, reference should now be had to the following specification and the accompanying drawing, of which Fig. 1 is a simple schematic diagram of a control system which is an embodiment of the invention, Fig. 2 is a chart of characteristic curves which facilitate an understanding of its operation and Fig. 3 is a modification of the system of Fig. 1.

Referring now to the drawing, the operating coil of an electromagnetic switching device 1 is connected in the anode-cathode circuit of an electric valve 2. The electromagnetic switching device 1 may be a control relay which is provided with a plurality of normally open contacts 3, 4, 5, 6, and 7, and a plurality of normally closed contacts 8, 9, 10 and 11. In an embodiment of the invention in a control system for a resistance welder, normally open contacts 3 may be employed to control the energization of a solenoid valve (not shown) which controls the admission of pressure fluid to a cylinder to cause a piston to move the electrodes toward each other, to hold and squeeze the workpieces.

Preferably, the valve 2 is a grid-controlled arc discharge device such as a thyratron; i. e., it has an anode 2a, a cathode 2b, and a control electrode 2c mounted within an envelope which contains a small amount of a relatively inert gas, such for example, as mercury vapor or argon. The anode-cathode circuit of the valve is supplied from a suitable source of alternating voltage, such as the supply conductors 12 and 12a. As shown, the cathode 2b is directly connected to the supply conductor 12a. A control initiating device, such as the starting switch 13, serves when its contacts are closed to connect the anode 2a of electric valve 2 through coil 1 to the opposite supply conductor 12. This switch is illustrated as a pushbutton type switch, of which the movable contact member is biased to the open position.

A second electromagnetic switching device 14 which is illustrated as a control relay is provided with an operating coil, a plurality of normally open contacts 15, 16, 17, 18, 19 and 20, and a plurality of normally closed contacts 21, 22, 23 and 24. The operating coil is connected across the supply conductors 12 and 12a in series with a half-wave rectifier 25 and a resistor 26. In the application of the invention to the control of a resistance welding machine, the normally open contacts 16 of relay 14 and the normally closed contacts 8 of relay 1 will preferably be connected in series relationship with each other in the firing circuit of the ignitron contactor in the welding current circuit.

A capacitor 27 is provided for controlling the pickup energization and dropout deenergization of the relay 14. It is arranged to be connected to the supply conductors 12 and 12a to be charged, and to be disconnected therefrom and reconnected in parallel with the coil of relay 14 to be discharged therethrough in order to effect the energization and deenergization of its coil and the pickup and dropout of its contacts.

For the purpose of timing the periods during which the operating coil of relay 1 is energized for pickup and deenergized for dropout, and its contacts picked up or dropped out, a resistance-capacitance timing unit is provided which comprises two capacitors 28 and 29, and four adjustable resistors 30, 31, 32 and 33.

Interlocking connections established by contacts of the control relays 1 and 14 effect a switching of each of the adjustable resistors 30, 31, 32 and 33 into a circuit with one or the other of the capacitors 28 and 29, to provide four timing circuits, each of which is independently adjustable. Thus, the invention makes it possible to effect four separately and independently adjustable timed operations by using but two relays and two timing capacitors. These four timed operations may be, for example, the "Squeeze," "Weld," "Hold" and "Off" operations of a resistance welding machine.

With the foregoing understanding of the elements and their organization in the system, the operation of the system itself will readily be understood from the following detailed description.

Initially, the system is in the normal or deenergized condition in which the operating coils of the relays 1 and 14 are deenergized and their contacts are in the positions in which they are illustrated. The resistors 32, 33, 30 and 31 are adjusted to provide the "Squeeze," "Weld," "Hold" and "Off" periods which are appropriate for the particular metal pieces which are to be welded.

An understanding of the operation of the system will be facilitated by reference to the chart of characteristic curves in Fig. 2, of which ordinates represent voltage or current and abscissae represent time.

Prior to initiating the operation, the capacitors 27, 28 and 29 are charged to the full peak value of the alternating voltage across the supply conductors as represented in Fig. 2 by the horizontal straight line portions of curves 35, 36 and 37 to the left of the zero time vertical axis. Actually, these horizontal portions of curves 35, 36 and 37 are colinear. However, they are illustrated slightly separated from each other, in order that they may be readily distinguished. Charging circuits for the capacitors are traced as follows:

1. For the capacitor 27; from supply conductor 12 through rectifier 25, normally closed contacts 21 of relay 14, normally closed contacts 10 of relay 1, capacitor 27 to supply conductor 12a.

2. For capacitor 28; from supply conductor 12 through rectifier 25, normally closed contact 9 of relay 1, capacitor 28 to supply conductor 12a.

3. For capacitor 29; from supply conductor 12 through rectifier 25, "Off" adjustment resistor 31, normally closed contacts 23 of relay 14, resistor 38 and capacitor 29 to supply conductor 12a.

It will be noted that the cathode of electric valve 2 is connected to supply conductor 12a, and its control electrode 2c is connected through adjustable resistor 30, normally closed contacts 22 and 23 of relay 14, adjustable resistor 31 and normally closed contacts 9 of relay 1 to the positive terminal of capacitor 28. Consequently, the valve 2 is in readiness to fire as soon as its anode circuit is completed.

To initiate the operation, the starting switch 13 is closed to complete the anode circuit of the valve. In response, the valve fires as indicated by the initial vertical position of curve 39. Its current rises steeply to full value, which full value is represented by the horizontal portion of curve 39 to the right of point 39a. The ordinate of the horizontal portion of the curve 39 may be considered to represent the average current which is conducted by the thyratron.

In response to the flow of anode-cathode circuit current through the operating coil 1, the relay picks up and closes its normally open contacts and opens its normally closed contacts. The energization of relay 1 is indicated by the initial vertical portion of curve 40, of which the ordinate of 40a may be considered to represent the coil current. Actually, the initial vertical portions of curves 39 and 40 are colinear, but they are illustrated as separate in time and different in magnitudes. The differences are made relatively large in order that the two curves may be readily distinguished.

Normally open contacts 5 in closing provide a sealing-in circuit in parallel with the contacts of the starting switch which now may be released. Contacts 3 in closing complete the energizing circuit of a solenoid valve (not shown) which, in response to energization, opens its port to admit pressure fluid to a cylinder, causing its piston to move the welding electrodes toward each other to squeeze the workpieces which are to be welded. This is the beginning of the "Squeeze" period as indicated in Fig. 2.

Normally closed contacts 9 in opening disconnect capacitor 28 from supply conductor 12, and contacts 6 in closing connect the positive terminal of capacitor 28 to the control electrode 2c of the electric valve. The opening of normally closed contacts 8 additionally interrupts the firing circuit of the welding ignitron contactor and prevents firing of the ignitron contactor until contacts 8 reclose following deenergization and dropout of relay 1.

Contacts 7 in closing connect upper terminal of capacitor 29 through rectifier 39, and contacts 5 to conductor 12. As a result, capacitor 29 is almost instantly discharged and recharged in opposite polarity to the full line peak voltage as represented by the steep vertical portion of curve 37 between points 37a and 37b.

Normally closed contacts 10 in opening disconnect capacitor 27 from supply conductor 12, and contacts 4 in closing complete a discharge circuit for capacitor 27 through the coil of relay 14. Since the voltage of the capacitor 27 is positive at its upper terminal, the discharge current adds to the standby current flowing in the coil and the combined currents are sufficient to energize the relay to pick up and close its normally open contacts 15, 16, 17, 18, 19 and 20, and open its normally closed contacts 21, 22, 23 and 24. The vertical portion of curve 36 between point 36a and the zero axis merely represents the instant of time at which the discharge of capacitor 27 is initiated and does not represent the actual value of the voltage during discharge. The pickup current of relay 14 is indicated by the steeply rising portion of curve 41 and the standby current is represented by the horizontal portion of curve 41.

The standby current which is supplied to the coil of relay 14 through resistor 26 is sufficient to retain the relay picked up after the discharge current of the capacitor decays to zero, but it is insufficient to pick it up initially. The picked up condition of the relay 14 is represented by the horizontal portion of the curve 43.

Contacts 18 of relay 14 in closing complete a discharge circuit for capacitor 28 through the contacts 6, "Squeeze" adjustment resistor 32, contacts 18, resistor 38 to the upper terminal of capacitor 29. Owing to the resistance of the circuit, capacitor 28 discharges at a relatively slow rate as represented approximately by the downwardly sloping portion of curve 35 to the right of point 35a.

The closing of contacts 16 partially completes the firing circuit of the ignitron contactor to prepare it for firing when relay 1 is subsequently deenergized and its contacts 8 are reclosed to complete the firing circuit.

Since the control electrode 2c of the electric valve 2 is direct connected to the upper terminal of capacitor 28, its voltage decreases in accordance with the portion of the curve 35 between points 35a and 35b. At the instant of time represented by the point 35b the voltage of the control electrode becomes more negative than the cathode voltage, and the electric valve 2 ceases to conduct and relay 1 is deenergized as indicated by the vertical portion of curve 40 between point 40b and the zero axis. Responsively to deenergization, relay 1 drops out its contacts. The cessation of conduction by the electric valve and the deenergization of relay 1 are indicated in Fig. 2 by the vertical portions of curves 39 and 40 between the points 39b and 40b respectively, and the zero axis. Contacts 8 in closing complete the firing circuit for the ignitron contactor, which fires and supplies current to the welding circuit. Thus, the dropping out of relay 1 represents the end of the "Squeeze" period and the beginning of the "Weld" period, as indicated in Fig. 2. However, the opening of contacts 3 has no immediate effect, since the paralleling contacts 15 of relay 14 remain closed and maintain the solenoid valve energized to maintain the welding electrodes squeezed against the work.

Contacts 7 of relay 1 in opening interrupt the negative charging circuit for capacitor 29. Contacts 6 open to disconnect the control electrode 2c from the capacitor 28. Since its discharge through the coil of relay 14, capacitor 27 has been standing substantially without charge. However, the closing of normally closed contacts 10 of relay 1 connecst its upper terminal through contacts 10 and 20 and the reversely connected rectifier 39 to supply conductor 12. This results in substantially instantaneous recharging of capacitor 27 to the full peak value of the supply voltage, with the voltage of its upper terminal negative as represented in Fig. 2 by the vertical portion of curve 36 between points 36b and 36c. Simultaneously, contacts 9 in closing reconnect capacitor 28 to the supply conductor 12. As a result, capacitor 28 is almost instantaneously charged to the full peak value of the line voltage as represented by the vertical portion of curve 35 between points 35b and 35c.

Responsively to the interruption of its charging circuit, capacitor 29 begins to discharge through the contacts 19, "Weld" time adjustment resistor 33, and to recharge to a positive polarity at its lower terminal as indicated by the rising portion of curve 37 between points 37c and 37d. Since the control electrode 2c of the electric valve 2 is connected through resistor 32, contacts 18 and resistor 38 to the negative terminal of capacitor 29, its voltage becomes decreasingly negative or increasingly positive in accordance with curve 37 until at point 37d it is sufficiently positive to fire the electric valve 2.

In response to conduction by the electric valve 2, relay 1 is gain energized and picked up as indicated by the vertical portion of curve 40 between points 40c and 40d. Contacts 7 in closing reconnect upper terminal of capacitor 29 through rectifier 39 to the supply conductor 12. Almost instantaneously, the capacitor 29 becomes charged to the full negative peak value of the supply voltage, with the polarity of the charge negative at its lower terminal. This rapid charge is indicated in Fig. 2 by the vertical portion of curve 37 between points 37e and 37f.

Contacts 8 in opening interrupt the firing circuit for the ignitron contactor, thereby rendering it nonconducting to interrupt the supply of welding current to the welding electrodes. This terminates the "Weld" period as indicated in Fig. 2.

The opening of contacts 10 of relay 1 interrupts the charging circuit for capacitor 27, and contacts 4 in closing complete a discharge circuit through the operating coil of relay 14. Since the charge on the capacitor is negative at its upper terminal, the discharge current opposes and overwhelms the holding current which the coil receives from the supply conductors. In response to deenergization, relay 14 drops out and opens its contacts 16 to prevent reclosing the firing circuit for the ignitron contactor by relay 1 when it is subsequently deenergized. The dropout of relay 14 is represented by the vertical portion of the curve 43 between points 43b and 43c.

In its dropped out position, relay 14 opens contacts 18 and 19, and closes contacts 22 and 23.

Contacts 9 of relay 1 in opening disconnect capacitor 28 from supply conductor 12, and contacts 6 and 7 in closing complete a discharge circuit for capacitor 28 through the "Hold" time adjustment resistor 30, contacts 22, resistor 38, contacts 7 and contacts 5.

Contacts 15 of relay 14 in opening have no immediate effect since they are paralleled by contacts 3 of relay 1 which closed before contacts 15 opened. Consequently, the solenoid valve remains energized and the welding electrodes are still held against the work. Thus, the opening of the firing circuit by contacts 8 marks the end of the "Weld" time period, and the beginning of the "Hold" time period, as indicated in Fig. 2.

As capacitor 28 discharges through the "Hold" adjustment resistor, the voltage of its positive terminal and that of the control electrode 2c of the electric valve decrease, in accordance with the portion of curve 35 between points 35d and 35e. Slightly before the time represented by point 35e, the voltage of the control electrode 2c becomes sufficiently negative to cause the valve to cease conducting, as indicated in Fig. 2 by the vertical portion of curve 39 between points 39e and 39f.

Relay 1 again drops out in response to deenergization as represented by the vertical portion of curve 40 between point 40e and the zero axis. Its contacts 3 in opening interrupt the energizing circuit of the solenoid valve, which releases the pressure which has been maintaining the welding electrodes forced against the work. Thus, this second dropout of relay 1 marks the end of the "Hold" time and the beginning of the "Off" time. The closing of contacts 9 and 10 completes the charging circuits for capacitors 28 and 27 to the supply conductor 12, causing them to recharge substantially instantaneously, as indicated by the vertical portion of curve 35 between points 35e and 35f, and the vertical portion of curve 36 between points 36e and 36f. The opening of contacts 7 of relay 1 interrupts the charging circuit of capacitor 29, causing it to discharge through the "Off" time adjustment resistor 31 in accordance with the portion of curve 37 between points 37f and 37g.

Since the control electrode 2c is connected through resistor 30 to the negative terminal of capacitor 29, the valve 1 is prevented from conducting and energizing relay 1 until, at a time corresponding to point 37h, the control electrode voltage again becomes sufficiently less negative to fire the electric valve, and pick up the relay 1. This instant marks the end of the "Off" time.

If the intiating switch 13 has been maintained closed during the foregoing entire sequence of operations, or if it was released and again closed before the end of the "Off" time, the previously described sequence of operations is repeated, provided the switch 34 is in the Repeat position, designated "R," in which it is illustrated in Fig. 1. However, if the switch 34 is in the non-repeat position designated "NR" in Fig. 1, and the initiating switch is maintained depressed throughout the cycle of operation described, the sequence cannot be repeated until the initiating switch is first released and allowed to open, following the last deenergization and dropout of relay 1. The reason for this is that if the switch 34 is in the non-repeat position, and the initiating switch 13 is closed, the last dropout of relay 1 and the closing of its contacts 11 complete a charging circuit for capacitor 29 through switch 34, rectifier 39 and initiating switch 13. Since the control electrode 2c is connected through resistors 30 and 38 to the negative terminal of capacitor 29, the valve 2 is maintained biased below cutoff until the initiating switch is opened and maintained open long enough for the capacitor 29 to be discharged and charge positive at its lower terminal through rectifier 25, resistor 31, contacts 23 and resistor 38, thereby to leave the system in a reset condition.

From the foregoing, it will be noted that the provision of four sequential operating periods, each separately timed, is accomplished by the use of only one electric valve, two timing capacitors, and two electromagnetic control relays. It will be further noted that the interlocking connections between the relays and the provision of a capacitor for energizing and deenergizing one of the relays effects an electrical "ratcheting" operation of the relays; i. e., in the automatic sequence of operations, there are two complete operations of relay 1 for each single complete operation of relay 14.

There are some industrial applications in which it is desired that the relay 14 shall not become energized when relay 1 is energized, but on the contrary shall first become energized when relay 1 is deenergized. This type of operation may be provided by substituting normally closed contacts for the normally open contacts 4 of relay 1 and normally open contacts for its normally closed contacts 10. With this modification, the coil of relay 14 would not become energized until relay 1 became deenergized and its normally closed contacts 4 closed to discharge the capacitor 27 through the coil of relay 14. The energization of relay 14 in this case is represented by the vertical portion of dotted curve 42 between the zero axis and point 42a. The deenergization of relay 14 would occur after the second deenergization of relay 1 and the closing of its normally closed contacts 4 to discharge the capacitor 27 through the coil of relay 14 in the opposite direction; i. e. in opposition to its holding current. This deenergization of relay 14 is represented by the vertical portion of dotted curve 42 between point 42b and the zero axis. Thus, relay 14 would still operate only once for each two operations of relay 1. However, it would become energized for pickup upon deenergization of relay 1 instead of upon its energization.

Although in accordance with the provisions of the patent statutes, this invention is described as embodied in concrete form, and the principle thereof has been explained, together with the best mode in which it is now contemplated applying that principle, it will be understood that the apparatus shown and described is merely illustrative and that the invention is not limited thereto, since alterations and modifications will readily suggest themselves to persons skilled in the art, without departing from the true spirit of this invention or from the scope of the annexed claims.

What I claim as new and desire to secure by Letters Patent of the United States, is:

1. In combination, first and second electroresponsive devices, a control initiating device for initiating a sequence of operations of said electroresponsive devices, timing devices rendered active in response to the operation of said electroresponsive devices for timing each of said operations, and interlocking control circuits jointly controlled by said electroresponsive devices for effecting a plural number of operations of one of said electroresponsive devices and a single operation of the other.

2. In combination, first and second electroresponsive devices each having contacts and an operating coil for opening and closing said contacts, a control initiating device for initiating a sequence of operations of said electroresponsive devices, timing devices active in response to the operations of said electroresponsive devices for timing each of said operations, and interlocking control circuits controlled by said contacts for correlating the operations of said electroresponsive devices to effect a predetermined plural number of operations of one of said electroresponsive devices and a single operation of the other of said electroresponsive devices.

3. In combination, first and second electroresponsive devices, each having contacts and an operating coil for opening and closing said contacts, a control initiating device for initiating a sequence of operations of said electroresponsive devices, timing devices controlled by said contacts in response to said operations for timing each of said operations, and interlocking control circuits controlled by said contacts for correlating the operations of said electroresponsive devices for effecting an energization and a deenergization of the coil of said first electroresponsive device for each energization or deenergization of the coil of said second electroresponsive device.

4. In combination, first and second electromagnetic switching devices each provided with contacts having first and second operating positions, a control device, a circuit including an electric valve connected to said control device to be responsive to operation thereof for controlling the energization of said electromagnetic devices to effect movement of said contacts to said first position, timing circuit means connected to be responsive to said operation of said electric valve for controlling said valve to effect operation of the contacts of a first of said devices to said second position a predetermined interval of time after said movement to said first position and holding circuit means for retaining the contacts of said second electromagnetic device in said first position after operation of the contacts of said first electromagnetic device to said second position.

5. In combination, first and second electromagnetic switching devices each provided with contacts having first and second operating positions, a control device, a circuit including an electric valve connected to said control device to be responsive to operation thereof for varying the energization of said electromagnetic devices to effect movement of said contacts to said first position, timing circuits selectively and sequentially energized in response to operation of said electromagnetic devices for controlling said valve to effect a predetermined number of operations of the contacts of one of said electromagnetic devices, and interlocking control circuits controlled jointly by both said electromagnetic devices for effecting a number of operations of the contacts of the other of said electromagnetic devices having with respect to said predetermined number a predetermined integral ratio different from unity.

6. In combination, first and second electromagnetic switching devices each provided with contacts having first and second operating positions, a control operation initiating device, a circuit including an electric valve connected to said control device to be responsive to operation thereof for varying the energization of said electromagnetic devices to effect movement of said contacts to said first position, a plurality of timing circuits selectively and sequentially activated in response to said operation of said electromagnetic devices for rendering said valve alternately conducting and nonconducting to effect a predetermined number of operations of the contacts of said first electromagnetic device, and interlocking control circuits controlled jointly by said electromagnetic devices for effecting one operation of the contacts of said second electromagnetic device for each two operations of the contacts of said first device.

7. In combination, first and second electromagnetic switching devices each provided with contacts having first and second operating positions, a control operation initiating device, a circuit including an electric valve provided with a control electrode and connected to be responsive to operation of said control device for varying the energization of said electromagnetic devices to effect operation of said contacts to said first position, a plurality of resistance-capacitance timing circuits selectively and sequentially actuated and each connected to said control electrode for rendering said valve conducting and nonconducting a predetermined number of times to effect an equal number of operations of the contacts of one of said electromagnetic devices, and interlocking control circuits for said electromagnetic devices and controlled jointly thereby for effecting a number of operations of the contacts of the other of said electromagnetic devices equal to one-half said predetermined number.

8. In combination, a pair of voltage supply conductors, a first circuit having connections to said supply conductors, a first electromagnetic device having an operating coil included in said circuit and provided with contacts having first and second operating positions, a second electromagnetic device having an operating coil connected across said supply conductors and provided with contacts having first and second operating positions, a resistor included in circuit with the coil of said second device for limiting its current obtained from said conductors to a value sufficient to maintain its contacts in said first position but insufficient to move them thereto, normally closed contacts on said second electromagnetic device for connecting across said conductors a capacitor and a charging circuit therefor, normally open contacts on said first electromagnetic device for completing a discharge circuit for said capacitor through said coil of said second device, a control device for initiating conduction through said electric valve to effect energization of said first electromagnetic device.

9. In combination, a pair of voltage supply conductors, a first circuit having connections to said supply conductors, a first electromagnetic switching device having an operating coil included in said circuit and provided with contacts having first and second operating positions, a second electromagnetic switching device having an operating coil connected to supply conductors and provided with contacts having first and second operating positions, a resistor included in circuit with the coil of said second device for limiting its current to a value sufficient to maintain its contacts in said first position but insufficient to move them thereto, normally closed contacts of said first electromagnetic device for connecting across said supply conductors a capacitor and a charging circuit, and normally open contacts for completing a discharge circuit for said capacitor through said coil of said second electromagnetic device, a control device for initiating conduction through said electric valve to effect energization of said first electromagnetic device and movement of its contacts to said first position thereby to open said normally closed contacts to interrupt said charging circuit and to close said normally open contacts to complete said discharge circuit to effect energization of said second electromagnetic device and operation of its contacts to said first position.

10. In combination, first and second electromagnetic switching devices each provided with contacts having first and second operating positions, a control operation initiating device, a circuit including an electric valve responsive to operation of said control device for varying the energization of said electromagnetic devices to effect movement of said contacts to said first position, a plurality of timing circuits selectively and sequentially activated in response to said operation of said electromagnetic devices for rendering said valve alternately conducting and nonconducting to effect a predetermined number of operations of the contacts of said first electromagnetic device, and interlocking control circuits controlled jointly by said electromagnetic devices for alternately effecting either pickup or a dropout of the contacts of said second electromagnetic device for each complete pickup and dropout of the contacts of said first device.

11. In combination, first and second electromagnetic switching devices each provided with an operating coil and with contacts having first and second operating positions, a control operation initiating device, a circuit including an electric valve responsive to operation of said control device for varying the energization of said electromagnetic devices to effect operation of said contacts to said first position, a plurality of timing circuits selectively and sequentially actuated in response to said operation of said electromagnetic devices for rendering said valve alternately conducting and nonconducting to effect a predetermined number of energizations and deenergizations of the coil of said first electromagnetic device to effect a corresponding number of pickups and dropouts of its contacts, and interlocking control circuits controlled jointly by said electromagnetic devices for effecting selectively an energization or a deenergization of the coil of said second electromagnetic device for each complete energization and deenergization of said first device thereby to effect selectively either a pickup or a dropout of the contacts of said second device for each complete pickup and dropout of the contacts of said first device.

12. In combination, a pair of voltage supply conductors, a first circuit supplied from said conductors, a first electromagnetic device having an operating coil included in said circuit and provided with contacts having first and second operating positions, a resistor included in said circuit for limiting the current suppled from said conductors to said coil to a value sufficient to maintain said contacts in said first position but insufficient to nove them thereto, a capacitor, an electric valve having connections to said supply conductors, a second electromagnetic device having an operating coil connected in circuit with said valve and provided with contacts having first and second operating positions including normally closed contacts for connecting said capacitor in a charging circuit across said conductors and normally open contacts for completing a discharge circuit for said capacitor through the coil of said first electromagnetic device, and a control device for initiating conduction through said electric valve to effect energization of said second electromagnetic device thereby to complete said discharge circuit and to effect energization of the coil of said first device to move its contacts to said first position.

13. In combination, a pair of voltage supply conductors, a first circuit supplied from said conductors, a first electromagnetic device having an operating coil included in said circuit and provided with contacts having first and second operating positions, a resistor included in said circuit for limiting the current supplied from said conductors to said coil to a value sufficient to maintain said contacts in said first position but insufficient to move them thereto, a capacitor, an electric valve having connections to said supply conductors, a second electromagnetic device having an operating coil connected in circuit with said valve and provided with contacts having first and second operating positions including normally closed contacts for connecting said capacitor in a charging circuit across said conductors and normally open contacts for completing a discharge circuit for said capacitor through the coil of said first electromagnetic device, a control device for initiating conduction through said electric valve to effect energization of said second electromagnetic device thereby to complete said discharge circuit and to effect energization of the coil of said first device to move its contacts to said first position, and a timing circuit responsive to movement of said contacts of said first electromagnetic device to said first position for deenergizing said valve a predetermined interval of time after its energization thereby to effect movement of its contacts to said second position to complete a circuit for charging said capacitor to the reverse polarity and to complete a second timing circuit for rendering said valve conducting a predetermined interval of time after its deenergization and contacts of said second electromagnetic device operable in said second position to discharge said capacitor in the reverse direction through said coil of said second device to effect its deenergization.

References Cited in the file of this patent

UNITED STATES PATENTS

| | | |
|---|---|---|
| 2,439,405 | Zierdt | Apr. 13, 1948 |
| 2,552,137 | Bivens | May 8, 1951 |

OTHER REFERENCES

"Review of Scientific Instruments," vol. 10, November 1939, pp. 323–324.